(12) United States Patent
Owen

(10) Patent No.: US 7,854,593 B2
(45) Date of Patent: Dec. 21, 2010

(54) AIRFOIL FOR A HELICOPTER ROTOR BLADE

(75) Inventor: Stephen J. Owen, Cheshire, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 700 days.

(21) Appl. No.: 11/356,406

(22) Filed: Feb. 16, 2006

(65) Prior Publication Data

US 2007/0187549 A1 Aug. 16, 2007

(51) Int. Cl.
B64C 27/46 (2006.01)

(52) U.S. Cl. ................................. 416/223 R; 244/35 R

(58) Field of Classification Search ............. 416/223 R, 416/DIG. 2, 241 R, 243; 244/17.11, 35 R, 244/39

See application file for complete search history.

(56) References Cited

U.S. PATENT DOCUMENTS

| | | | | |
|---|---|---|---|---|
| 3,728,045 A | * | 4/1973 | Balch | 416/223 R |
| 4,142,837 A | * | 3/1979 | de Simone | 416/223 R |
| 4,248,572 A | * | 2/1981 | Fradenburgh | 416/228 |
| 4,392,781 A | * | 7/1983 | Mouille et al. | 416/223 R |
| 4,412,664 A | * | 11/1983 | Noonan | 244/35 R |
| 4,416,434 A | * | 11/1983 | Thibert et al. | 244/35 R |
| 4,427,344 A | * | 1/1984 | Perry | 416/223 R |
| 4,776,531 A | | 10/1988 | Noonan | |
| 4,783,023 A | * | 11/1988 | Jupe | 244/6 |
| RE33,589 E | * | 5/1991 | Lednicer et al. | 416/223 R |
| 5,137,427 A | * | 8/1992 | Shenoy | 416/223 R |
| 5,344,102 A | * | 9/1994 | Nakadate et al. | 244/35 R |
| 5,791,878 A | * | 8/1998 | Wainauski et al. | 416/223 R |
| 6,000,911 A | * | 12/1999 | Toulmay et al. | 416/223 R |
| 6,116,857 A | * | 9/2000 | Splettstoesser et al. | 416/228 |
| 6,361,279 B1 | * | 3/2002 | Rodde et al. | 416/223 R |
| 6,497,385 B1 | * | 12/2002 | Wachspress et al. | 244/7 R |
| 7,252,479 B2 | * | 8/2007 | Bagai et al. | 416/223 R |
| 2007/0020104 A1 | * | 1/2007 | Moffitt et al. | 416/223 R |
| 2007/0110582 A1 | * | 5/2007 | Bagai et al. | 416/223 R |

OTHER PUBLICATIONS

PCT International Search Report and written opinion mailed Aug. 27, 2008.

* cited by examiner

*Primary Examiner*—Michael R Mansen
*Assistant Examiner*—Brian M O'Hara
(74) *Attorney, Agent, or Firm*—Carlson, Gaskey & Olds PC

(57) ABSTRACT

An airfoil family for a helicopter rotor blade, designated SC362XX. SC362XX essentially removes the large lower surface suction peak associated with 'drag creep' at moderate lift coefficients while reducing the peak Mach number and shock strength at high lift/Mach number conditions. Another optional airfoil family for use at inboard regions of the helicopter rotor, which is designated SC3252XX airfoil family, is a relatively thicker airfoil section that includes a significant increase in thickness forward of the 30% x/c location to provide a relatively thick and rigid inboard section. The lift coefficient at which the drag divergence Mach number was optimized is the same in both families thereby readily providing application to a single rotor blade.

14 Claims, 12 Drawing Sheets

AIRFOIL FOR A HELICOPTER ROTOR BLADE

BACKGROUND OF THE INVENTION

The present invention is directed to an improved airfoil for use with a helicopter rotor and more particularly to an airfoil section for at least partial use on a main rotor blade of a helicopter rotor.

Conventional rotary-wing aircraft have a forward airspeed limited by a number of factors. Among these is the tendency of the retreating blade to stall at high forward airspeeds. As the forward airspeed increases, the airflow velocity across the retreating blade slows such that the blade may approach a stall condition. In contrast, the airflow velocity across the advancing blade increases with increasing forward speed. Forward movement of the aircraft thereby generates a dissymmetry of lift between the advancing and retreating sides of the rotor. This dissymmetry may create an unstable condition if lift is not equalized across the advancing and retreating sides of the rotor.

At higher speeds, such as, at the outer tip regions of conventional rotary wing aircraft or on high-speed rotary wing aircrafts, for example, on a helicopter including a coaxial contra-rotating rotor system with an auxiliary translational propulsion system, high performance 2-dimensional airfoils are required. That is, the requirements on an airfoil section at higher speeds are generally more complex than those for a fixed wing aircraft because, on a single revolution of the rotor blade, an airfoil section thereof experiences lift coefficients from negative values to positive value with section Mach numbers from subsonic to transonic values. Since the ranges of lift coefficients and Mach numbers experienced by an airfoil section depend on its radial location along the rotor blade and the rotary-wing aircraft flight conditions, different airfoil sections have been used for a specified range of radial positions along the rotor blade span.

The maximum lift coefficient of an airfoil section is of considerable importance in the process of selecting airfoils for application to a rotary-wing aircraft rotor. When the maximum lift coefficient of an airfoil section is exceeded (i.e., the airfoil is stalled), the corresponding drag coefficient increases dramatically and the pitching moment coefficient can change direction (nose-up to nose-down) as well as change greatly in magnitude. When a significant part of the rotor blade is operating beyond the maximum lift coefficient of the local airfoil section, the power required to sustain flight exceeds the power available, thus limiting the particular flight condition. This could occur with increases in aircraft gross weight, in maneuvers, or in forward flight.

The problem may occur over the outer portion of a rotor blade such as that utilized on high-speed rotary wing aircraft or at the outer tip regions of conventional rotary wing aircraft rotor blades where drag divergence Mach numbers of present state-of-the art rotary wing airfoils are exceeded. Reducing airfoil thickness ratios can alleviate this problem, however, typically at the expense of hover figure of merit due to the decrease in an airfoil's maximum lift capability when thickness is reduced.

Hover figure of merit can then be increased with additional blade area, however, this approach reduces cruise efficiency since the increased blade area is not required in this flight regime. Some compromise between hover figure of merit and cruise efficiency must thereby be achieved by the designer. Designing airfoils with higher maximum lift coefficients at a desired Mach number while simultaneously increasing the drag divergence Mach number for moderate lift coefficients provides the rotor designer the additional aerodynamic performance necessary to get cruise speeds up into the 400 knot range.

As manufacturers look at new ways to increase the speed of rotary wing aircraft significantly different rotor blade designs are required. Accordingly, it is desirable to provide an improved airfoil family for contra-rotating rotor systems as well as outboard stations of single rotor rotary-wing aircraft.

SUMMARY OF THE INVENTION

An airfoil family for a helicopter rotor blade according to the present invention is designated as a SC362XX airfoil family. The SC362XX family removes a lower surface suction peak associated with 'drag creep' at moderate lift coefficients and reduces the peak Mach number and shock strength at high lift/Mach number conditions of the prior art airfoil family. The resulting airfoil has significant improvements in maximum lift at moderate Mach numbers (0.4, 0.5 and 0.6), total elimination of the drag "creep" and improved drag divergence characteristics at moderate lift coefficients (0.1 and 0.2) when compared to prior art airfoils, such as, SC2110.

The airfoil includes a reduced thickness and camber of the leading edge region ($x/c \leq 0.3$) which delays the formation of shock waves at high Mach number/low lift coefficient and moderate Mach number/high lift coefficient conditions. This results in improvements in maximum lift coefficient and drag divergence Mach number performance compared to the prior art. Further improvements in airfoil performance are achieved by enhancing the stability of the boundary layer on the trailing edge portion of the airfoil ($x/c \geq 0.5$) by thinning this portion of the airfoil.

Airfoil family SC362XX, according to the present invention, provides an improved airfoil optimized for use on helicopter rotors capable of higher speed. By helicopter rotors, the inventors intend to mean high speed compound rotary-wing aircrafts (as will be further discussed below) and more conventional aircraft configurations such as conventional single rotor helicopters and tandem helicopters. Furthermore, the airfoil could be incorporated onto the tail rotor blade or, preferably, onto the main rotor blade. Finally, the airfoil could be incorporated into the entire length of a rotor blade, or just a portion thereof, such as, for example, the outer 15% to 20% of the main rotor blade on a conventional single rotor helicopter.

According to the present invention, another separate, distinct and optional airfoil family, which is preferably for use at inboard regions of a helicopter rotor blade, is designated as SC3252XX. The SC3252XX airfoil is a relatively thick airfoil section which includes a significant increase in thickness forward of the 30% x/c location to provide a relatively thick and rigid inboard section. Since this family of airfoils is preferably located on the inboard portion of the rotor, rotational velocities at which they operate are significantly lower than their outboard counterparts. Therefore, the Mach number at which maximum lift was optimized for this family is significantly lower when compared to the SC362XX family (0.25 vs. 0.6). The lift coefficient at which the drag divergence Mach number was optimized remained the same as the SC362XX family (0.2).

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
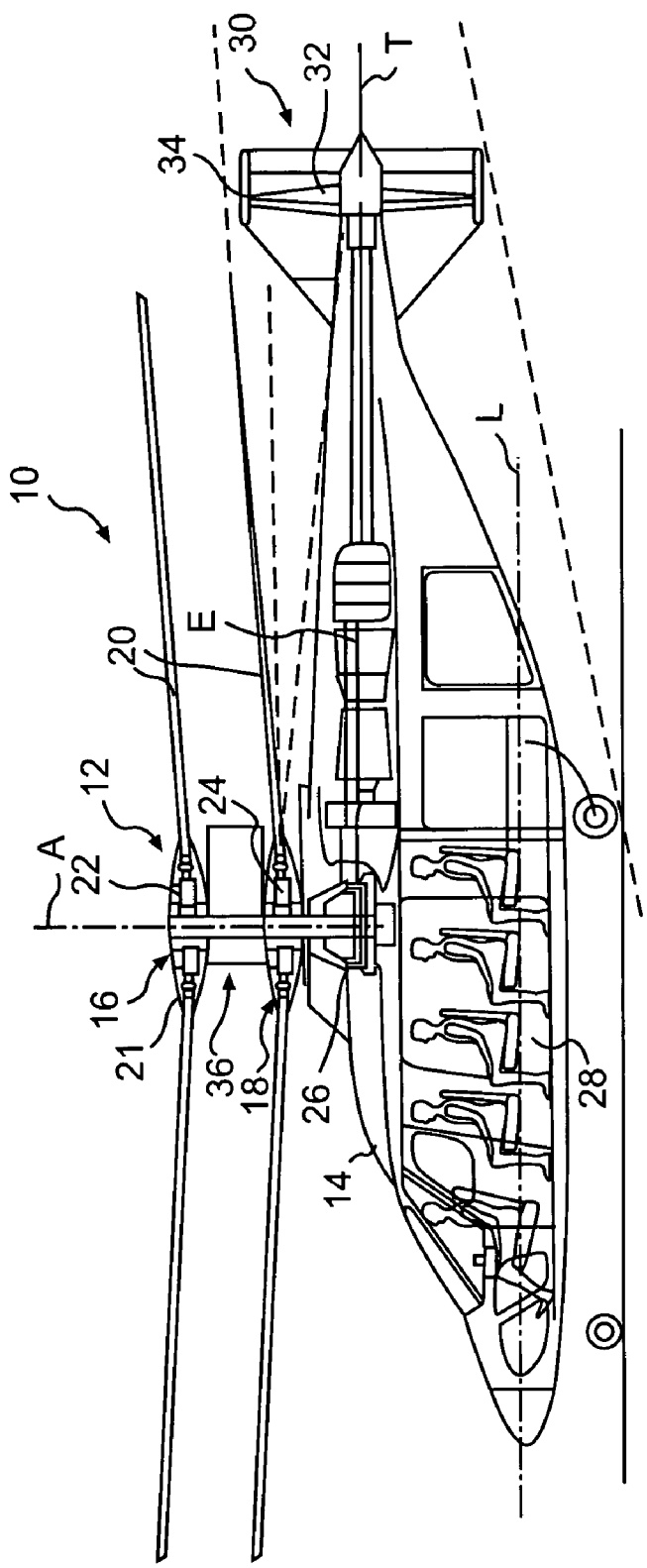
FIG. 1A is a general schematic view of an exemplary helicopter having a dual, contra-rotating, coaxial rotor system which may incorporate an airfoil designed according to the present invention.
Figure 1B:
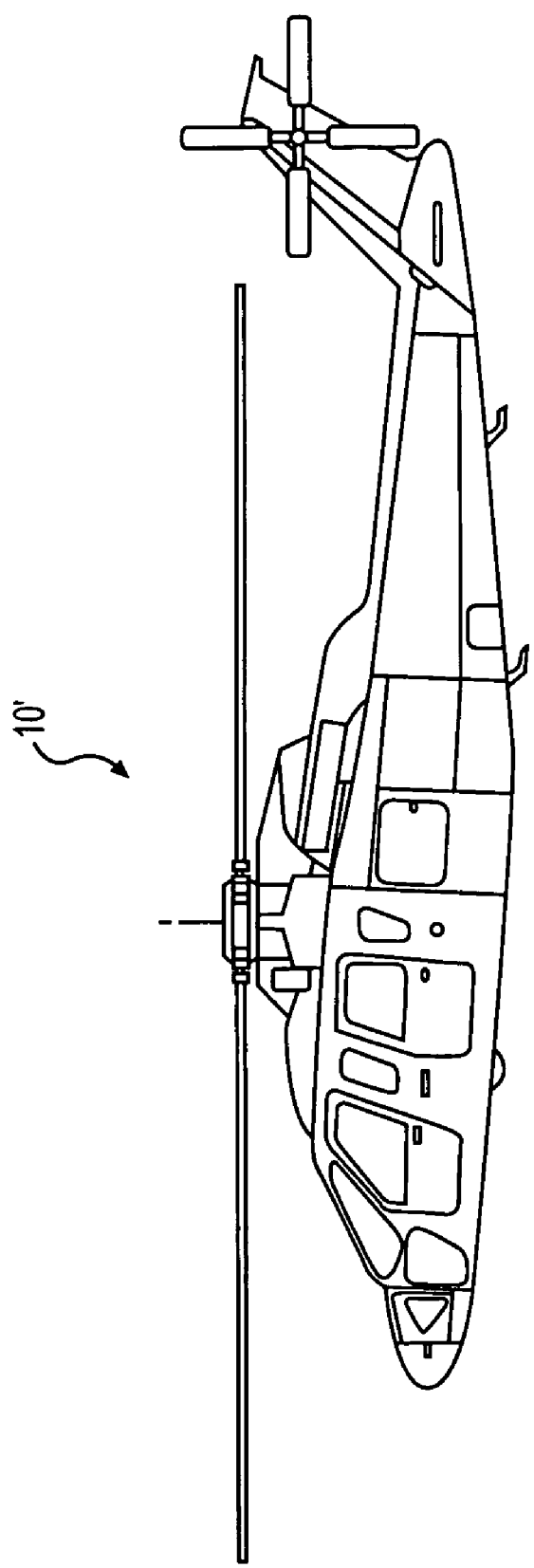
FIG. 1B is a schematic view of an exemplary rotary wing aircraft having a single rotor system.

FIG. 1A illustrates an exemplary high speed compound rotary-wing aircraft 10 having a dual, contra-rotating, coaxial rotor system. 12. The aircraft 10 includes an airframe 14 that supports the rotor system 12 as well as a propulsive system 30 which provides translational thrust generally parallel to an aircraft longitudinal axis L. Although a particular aircraft configuration is illustrated in the disclosed embodiment, other helicopter configurations such as tandem rotors, as well as more conventional single rotor helicopters (FIG. 1B) will also benefit from the present invention.

By way of background information, a high speed compound rotary-wing aircraft with a dual, contra-rotating, coaxial rotor system as shown in FIG. 1 is capable of higher speeds compared to conventional single rotor helicopters due in part to the balance of lift between the advancing sides of the main rotor blades on the upper and lower rotor systems. In addition, the retreating sides of the rotors are also generally free from classic retreating blade stall that conventional single or tandem rotor helicopters may suffer from. Design requirements for a high speed compound rotary-wing aircraft with a dual, contra-rotating, coaxial rotor system differ significantly from conventional rotary-wing aircraft. As with a conventional rotary-wing aircraft, the advancing blades of both the upper and lower rotors produce lift; however, unlike a conventional rotary-wing aircraft, the retreating blades of the a high speed compound rotary-wing aircraft are off-loaded commensurate with increasing flight velocity, and need not produce lift to balance lateral (rolling) moments. Rather, roll equilibrium is attained by balancing the net effects of the equal and opposite moments produced by the advancing side blades of the vertically separated counter-rotating rotors. The ability to off-load the retreating blades from producing lift alleviates retreating blade stall—a primary cause of speed limitation on conventional rotary wing aircraft—thereby permitting much greater forward flight speeds to be achieved Referring back to FIG. 1A, the dual, contra-rotating, coaxial rotor system 12 includes a first rotor system 16 and a second rotor system 18. Each rotor system 16 and 18 includes a plurality of rotor blades 20 mounted to a rotor hub assembly 22, 24 for rotation about a rotor axis of rotation A. The plurality of the main rotor blades 20 project substantially radially outward from each of the hub assemblies 22, 24 and are supported therefrom in one of numerous attachments arrangements typically including a blade cuff (illustrated schematically at 21). Any number of rotor blades 20 may be used with the dual, contra-rotating, coaxial rotor system 12. The dual, contra-rotating, coaxial rotor system 12 is driven by a main gearbox 26 that is driven by one or more engines E.

A translational thrust system 30 preferably includes a pusher propeller 32 having a propeller rotational axis T oriented substantially horizontal and parallel to the aircraft longitudinal axis L to provide thrust for high-speed flight. Preferably, the pusher propeller 32 is mounted within an aerodynamic cowling 34 mounted to the rear of the airframe 14. The translational thrust system 30 is driven by the same main gearbox 26 which drives the rotor system 12.

Figure 2A:
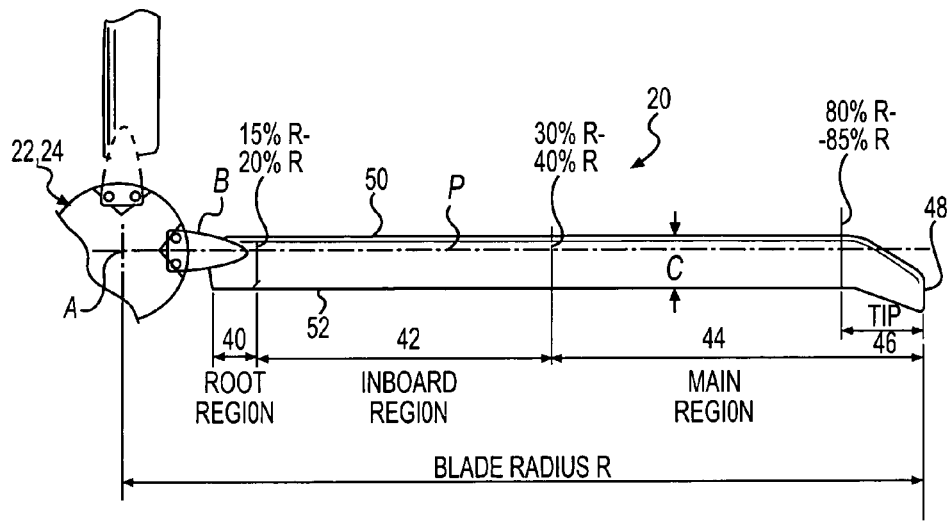
FIG. 2A is a plan view of a main rotor blade designed according to the present invention.

FIG. 2A illustrates a general exemplary plan view of a main rotor blade 20 which includes the inventive airfoil sections designed according to the present invention. The exemplary plan view further illustrates an exemplary basic chord distribution and distribution of blade area relative to blade span. The rotor blade 20 can generally be divided into a root region 40, an inboard region 42, a main region 44, and a tip region 46. The root, inboard, main, and tip regions 40, 42, 44, 46 define the span of the rotor blade 20 and define a blade radius R between the axis of rotation A and a distal tip end 48 of the blade tip region 46. The rotor blade 20 defines a leading edge 50 and a trailing edge 52, which define the chord C of the rotor blade 20. A pitching or feathering axis P is the axis about which aerodynamic blade twist primarily occurs.

The blade region extending inboard of approximately 30% R, and preferably inboard of 15% R, defines the root region 40 and includes the blade to hub attachment system (schematically illustrated). Notably, the rotor blade 20 is mounted along the root region 40 so that the root region 40 has comparatively minimal aerodynamic significance since it is typically at least partially enclosed within the blade cuff B (illustrated schematically). The blade cuff mounts the rotor blade 20 to the rotor hub assembly 22, 24 as generally understood and thus further detailed discussion need not be provided herein. The region of the blade that lies between the root end 54 and main region 44 of the blade 20 is the inboard region 42. The main region 44 of the blade 20 is the primary aerodynamic portion of the blade 20 inclusive of the tip region 46. The tip region 46 is preferably the outboard 15% R to 20% of the rotor blade 20. It should be understood that the blade is illustrated somewhat schematically and that various chord distributions along the blade span will also be usable with the present invention.

Figure 8A:
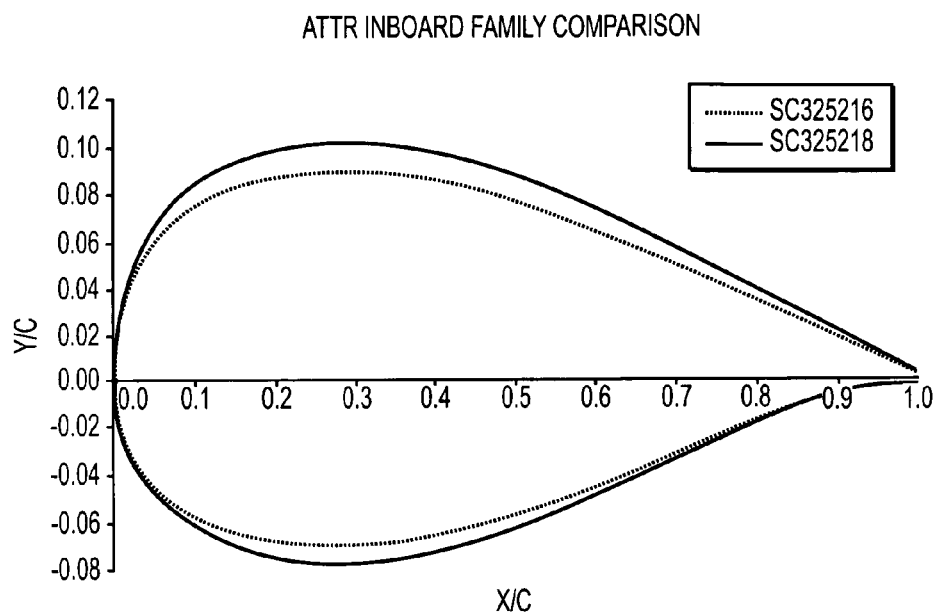
FIG. 8A is an airfoil family comparison of an SC3252XX airfoil of different t/c of the present invention.
Figure 8B:
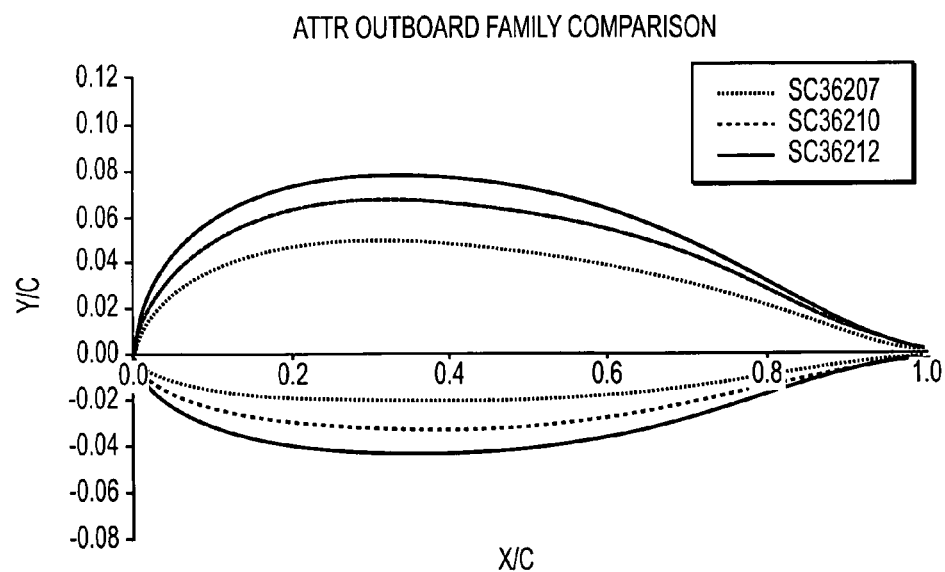
FIG. 8B is an airfoil family comparison of an SC362XX airfoil of different t/c of the present invention

In order to provide performance goals for a helicopter rotor system, Applicant is specifically disclosing "base" airfoil profiles from which additional airfoil profiles can be extracted by varying thickness and camber levels (as illustrated in FIGS. 8A and 8B). The selected sections are preferably: a 10% thick outboard section designated SC36210 of the SC362XX airfoil family and an optional 18% thick inboard section designated SC325218 of the SC3252XX airfoil family. It was anticipated that the SC325218 would be utilized for a thickness range of 12 to 18% (SC325212 to SC325218) while the SC36210 would vary from 7 to 12% (SC36207 to SC36212).

The design methodology employed for designing these sections include beginning with an existing airfoil which was revised using the inverse and/or multi-point optimization techniques within ISES software until the appropriate level of performance was attained. As previously described however, it should be noted, that a helicopter rotor blade may incorporate airfoil section SC362XX throughout its entire length inclusive of the inboard, main and outboard regions. It is anticipated that this would be more beneficial to a high speed compound rotary-wing aircraft with a dual, contra-rotating, coaxial rotor system wherein the entire main rotor blade may be subjected to higher speeds. Alternatively, for example, a conventional single rotor helicopter may incorporate airfoil section SC362XX only on a portion of its length, preferably the outer tip region, which is subjected to higher speeds, and any other known airfoil section on its inboard and main regions, which are subjected to lower speeds as compared to the outboard tip region.

Figure 2B:
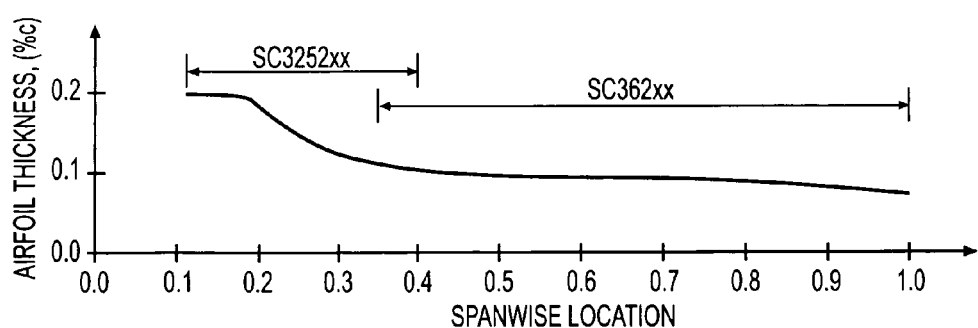
FIG. 2B is a representative thickness over chord distribution (T/C) of the rotor blade illustrated in FIG. 2A.

The airfoil thickness to chord ratios (t/c), are graphically represented in FIG. 2B to generally correspond with the plan view of the rotor blade 20 (FIG. 2A). Referring to FIG. 2B, the exemplary rotor blade preferably includes at least two primary airfoil profile families. For example, inboard of approximately 0.4 R an SC3252XX airfoil profile family may be utilized while outboard of approximately 0.35 R an SC362XX airfoil profile family may be utilized. The SC36212 airfoil profile may be utilized at the transition therebetween. It should be understood that the overlap of airfoil profile sections as illustrated in FIG. 2B provides for a smooth transition therebetween. The overlap may incorporate intermediate airfoil profiles and may cover various spans as graphically represented by the smooth interface transitions and overlap.

Figure 2C:
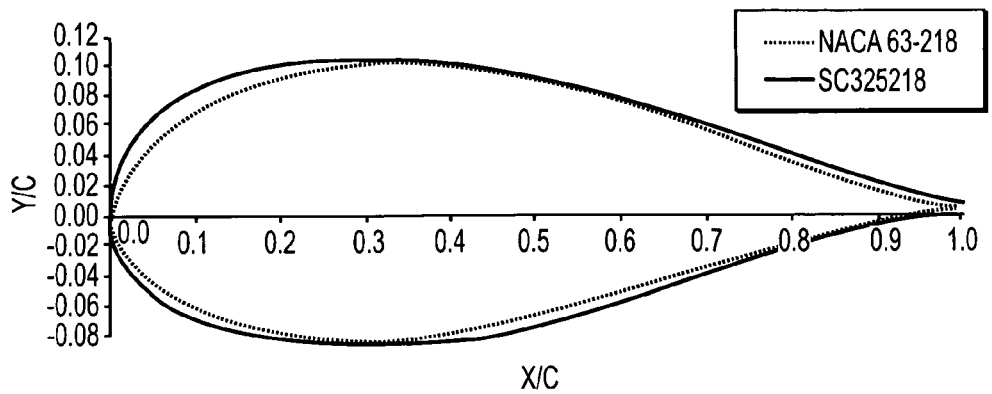
FIG. 2C is a sectional view taken at the location indicated in FIG. 2B.
Figure 2D:
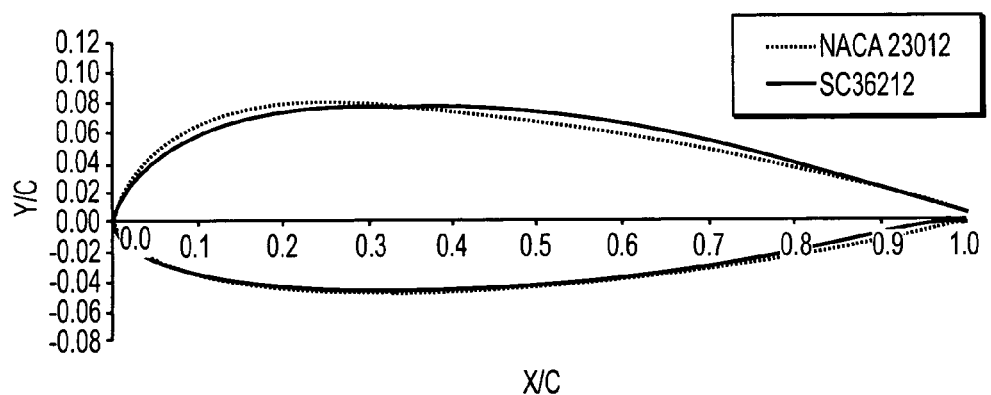
FIG. 2D is a sectional view taken at the location indicated in FIG. 2B.
Figure 2E:
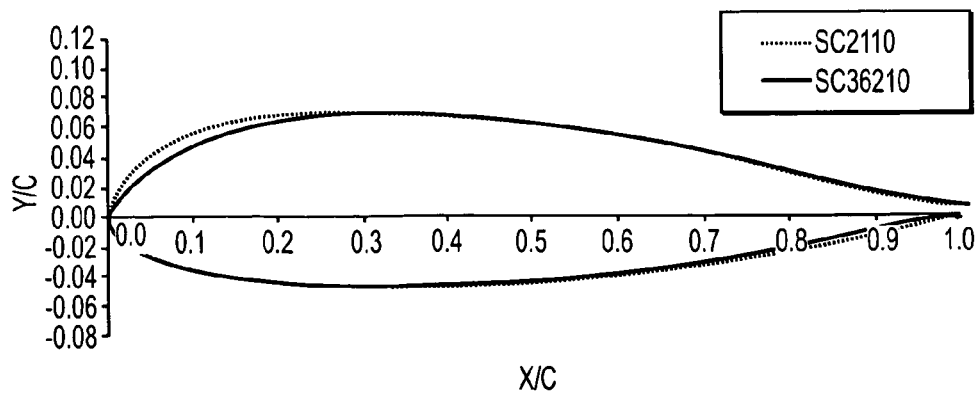
FIG. 2E is a sectional view taken at the location indicated in FIG. 2B.

FIGS. 2C, 2D and 2E illustrate the airfoil profiles utilized in construction of the exemplary rotor blade 20. The SC325218 airfoil profile is a relatively thick airfoil and hence is preferably utilized in the inboard region of the rotor blade 20. However, other airfoil families as generally known in the art may be utilized in the inboard region of the rotor blade. The SC36212 airfoil profile is a section preferably utilized in an intermediate region of the rotor blade and the SC36210 airfoil profile is a section preferably utilized in the outer tip region of the rotor blade. This particular airfoil arrangement has been found to reduce compressibility effects at the tip while maintaining lift.

As generally understood, the SC362XX family of airfoils maximize lift at 0.6 Mach and drag divergence Mach number ($M_{dd}$) at 0.2 lift coefficient.

A prior art SC2110 airfoil profile was utilized as a starting point for the SC36210 airfoil (FIG. 2E). The SC2110 airfoil profile is a mid-span high lift rotor airfoil designed for maximum lift at Mach 0.4 and maximum drag divergence Mach number at a lift coefficient of 0.0. The SC2110 airfoil, however, exhibits a certain amount of "drag creep" prior to reaching divergence levels. These conditions differ significantly from a high speed helicopter rotor embodiment and this particular trait has been eliminated in Applicant's inventive blade design.

Figure 3:
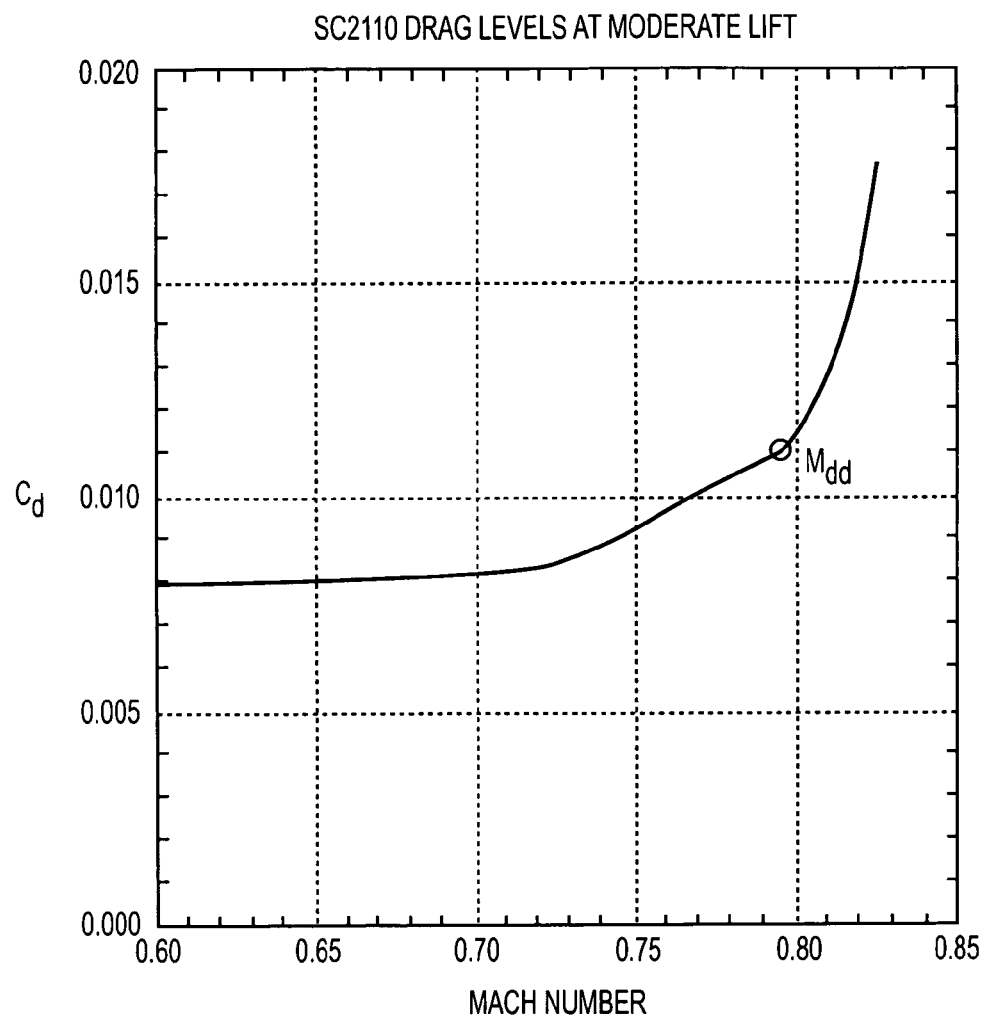
FIG. 3 is a graph of a prior art SC2110 airfoil drag level at moderate lift.
Figure 4:
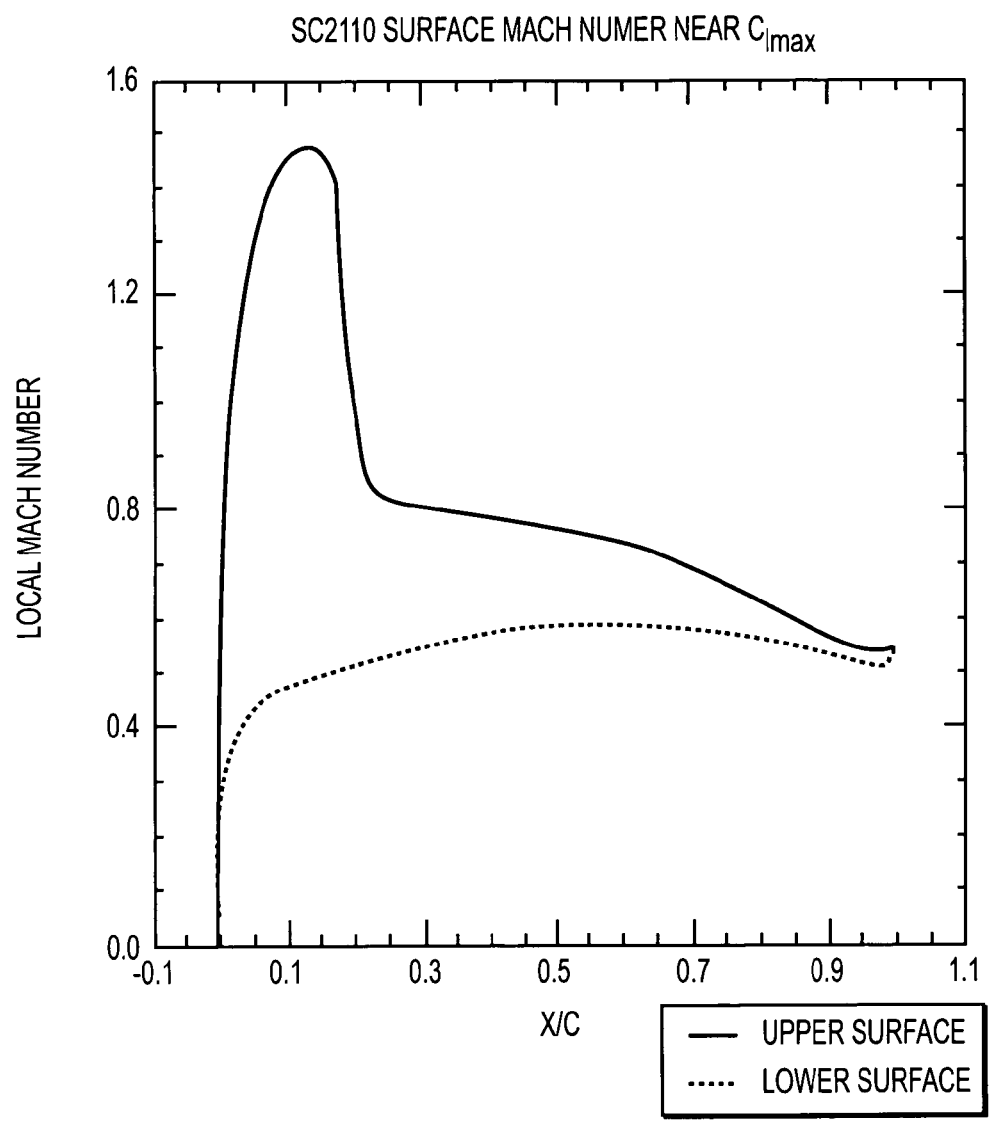
FIG. 4 is a graph illustrating a prior art SC2110 airfoil local Mach number distribution near CL Max.

The prior art SC2110 has strong shocks present on both the upper and lower surface at high mach number and moderate lift coefficients. The lower surface shock appears at Mach numbers well below $M_{dd}$ producing the "drag creep" as FIG. 3 illustrates. Meanwhile, the appearance and subsequent strengthening of the upper surface shock with increasing Mach number produces the wave drag associated with divergence. As FIG. 4 illustrates, at Mach numbers between 0.5 and 0.6, a strong shock wave is present on the upper surface leading edge of the airfoil which induces boundary layer separation and limits the attainable maximum lift. The difficulty here is to improve drag divergence and maximum lift properties of the airfoil simultaneously since each requires changes to different portions of the airfoil. Reducing the leading edge shock at maximum lift conditions will almost invariably reduce the drag divergence performance.

As FIG. 2E illustrates, Applicant significantly modified the upper and lower surface contour of the prior art SC2110 airfoil over the first 30% of the airfoil ($0.0 \leq x/c \leq 0.3$). These modifications removed the large lower surface suction peak associated with the inherent 'drag creep' of the prior art SC2110 airfoil at moderate lift coefficients and reduced the peak Mach number and shock strength at high lift/Mach number conditions. The resulting airfoil has significant improvements in maximum lift at moderate Mach numbers (0.4, 0.5 and 0.6), total elimination of the prior art SC2110 airfoil drag "creep" and improved drag divergence characteristics at moderate lift coefficients (0.1 and 0.2)

The inventive SC362XX airfoil profile family was developed by reducing the thickness and camber of the leading edge region of the prior art airfoil ($x/c \leq 0.3$) delaying the formation of shock waves at high Mach number/low lift coefficient and moderate Mach number/high lift coefficient conditions. This results in improvements in maximum lift coefficient and drag divergence Mach number performance compared to the prior art airfoil. Further improvements in airfoil performance was achieved by enhancing the stability of the boundary layer on the trailing edge portion of the airfoil ($x/c \geq 0.5$) by thinning this portion of the airfoil.

Because of the difficulty involved in giving an adequate word description of the particular airfoil section being described, the coordinates for the invention airfoil section SC36210 of the SC362XX airfoil family is set forth in Table I, the coordinates for the inventive airfoil section designated SC36212 of the SC362XX airfoil family is set forth in Table II, and the coordinates for the inventive airfoil section designated SC325218 of the SC3252XX airfoil family is set forth in Table III.

From the above description of the structural arrangement of the airfoil sections, operation of the invention should now become apparent. The airfoil section critical 2-D conditions for a high speed helicopter rotor blade are a maximum lift coefficient and lift to drag ratio at Mach 0.6 (hover) and a drag divergence Mach Number at a lift coefficient of 0.2 (cruise).

Figure 5:
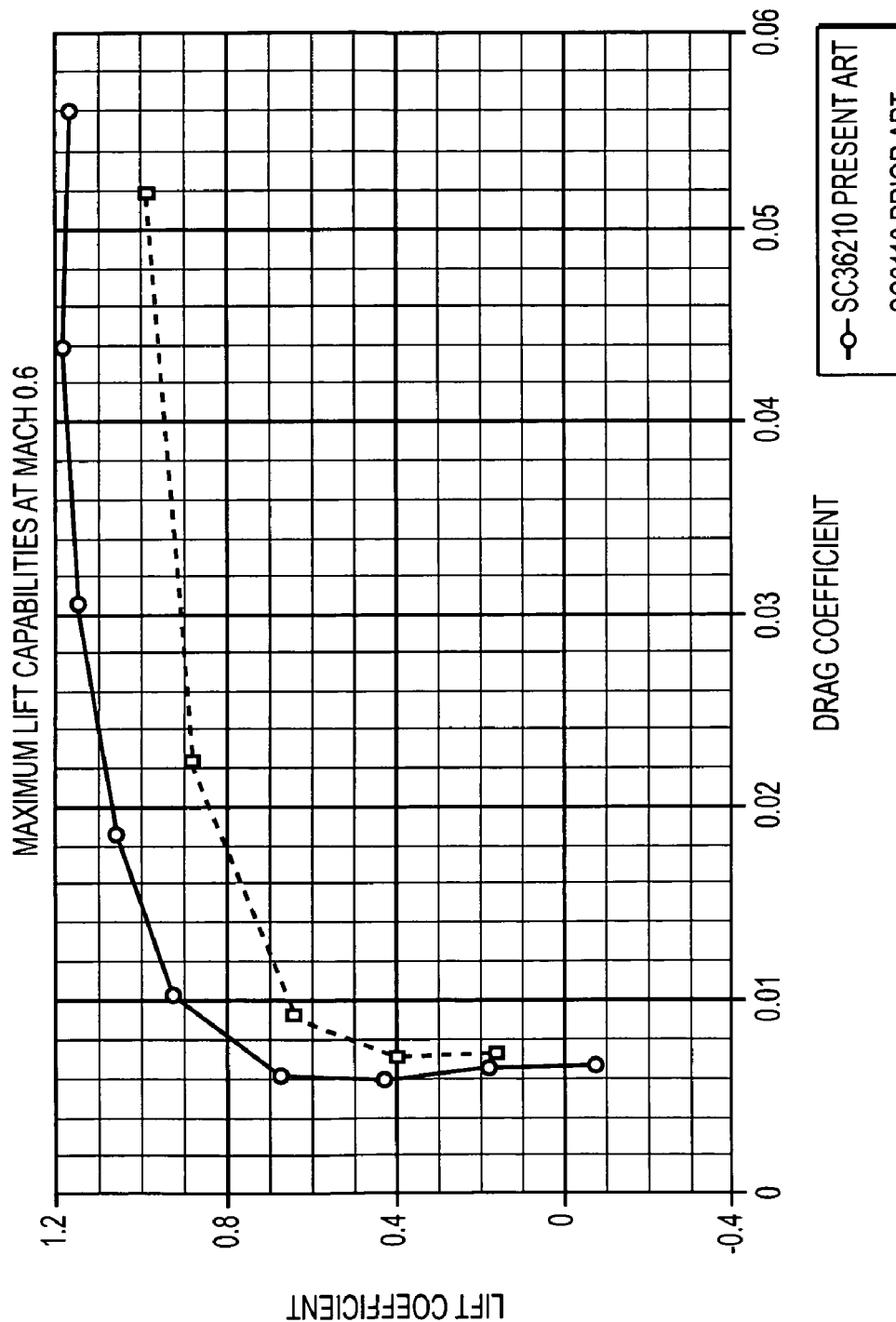
FIG. 5 is a graph illustrating the lift and drag capabilities at Mach 0.6 comparing the prior art SC2110 airfoil with the SC36210 airfoil of the present invention.
Figure 6:
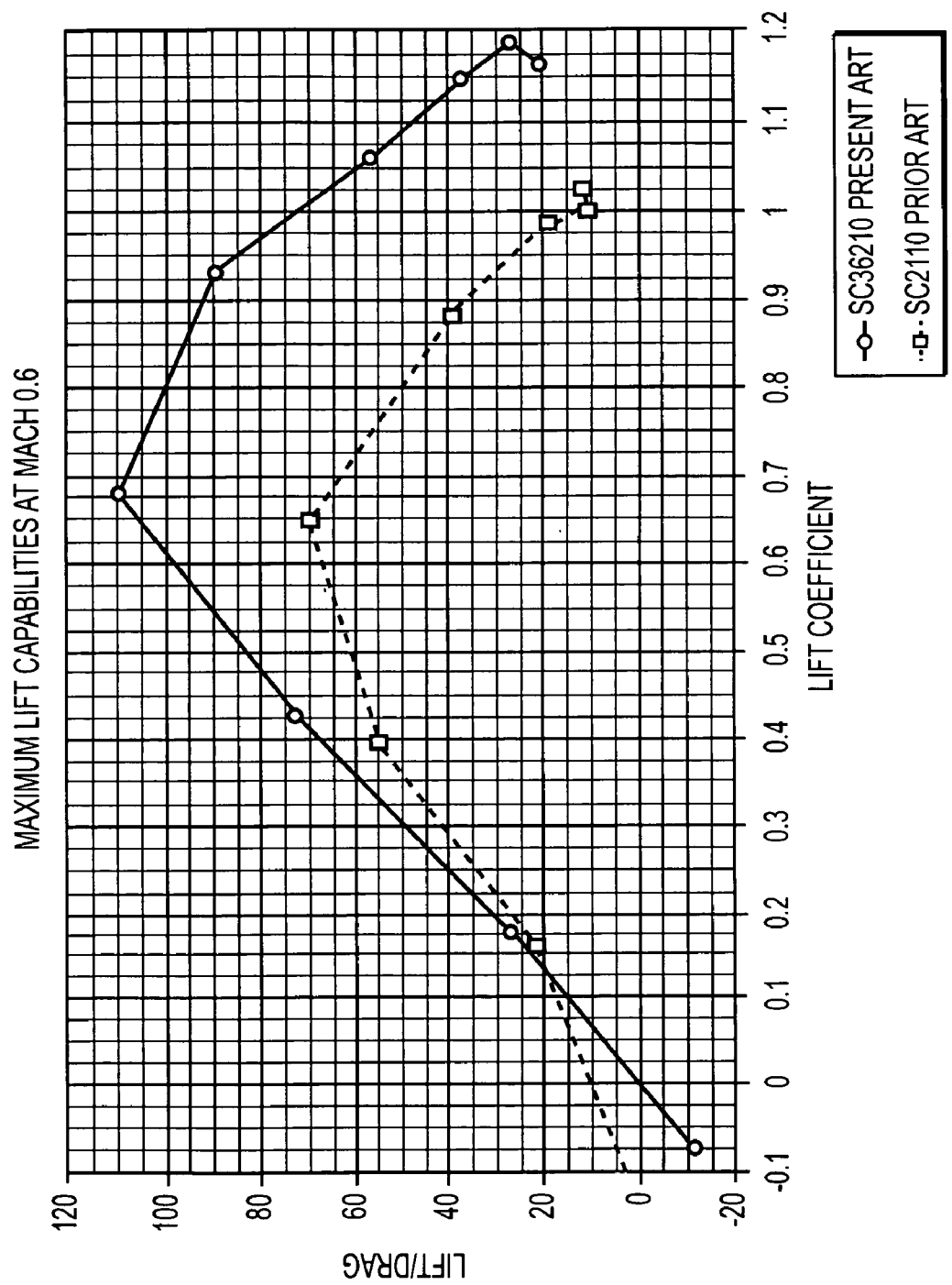
FIG. 6 is a graphical representation of the maximum lift capabilities at Mach 0.6 comparing the prior art SC2110 airfoil as compared to the SC36210 airfoil of the present invention.
Figure 7:
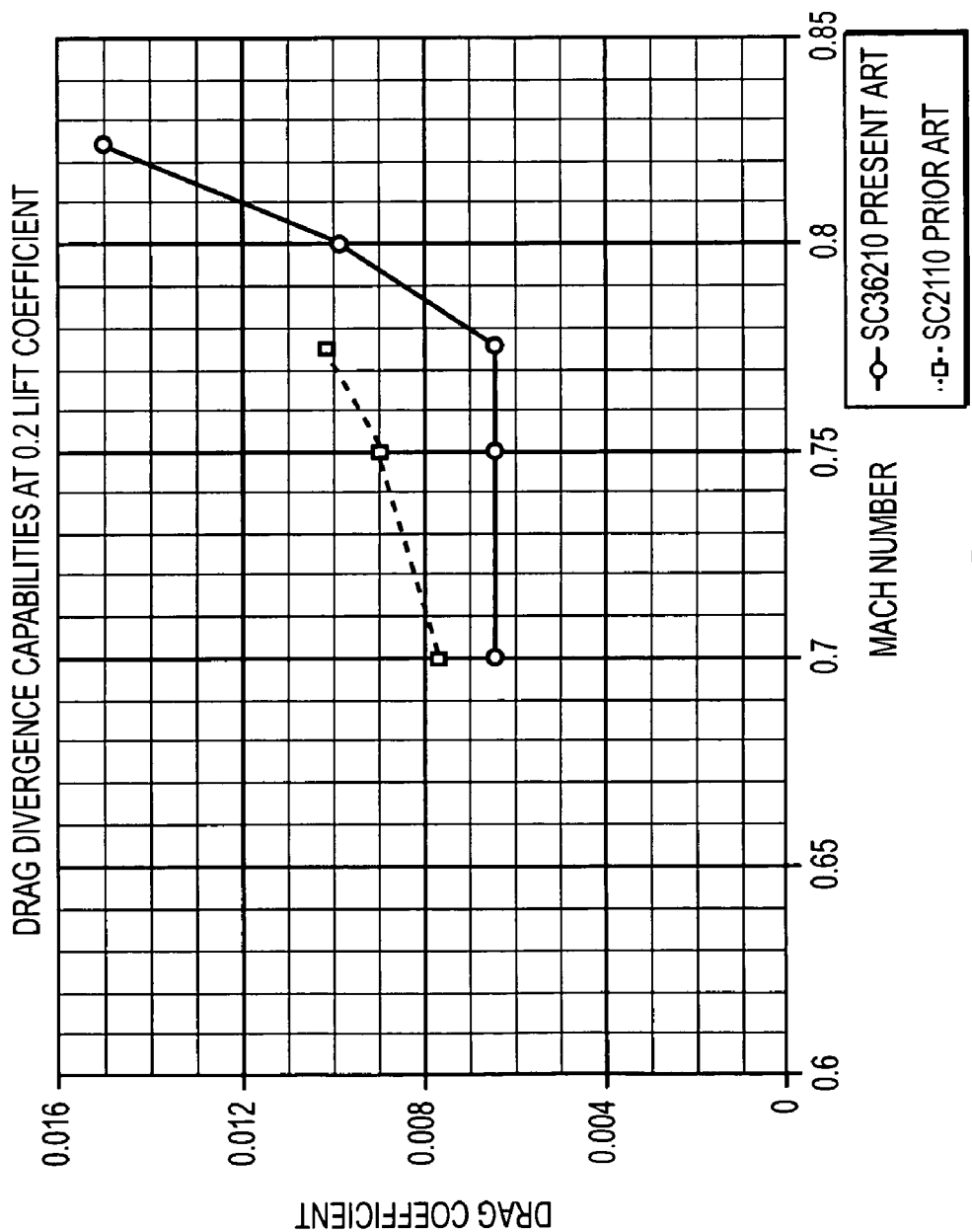
FIG. 7 is a graphical representation of the drag divergent capabilities at 0.2 lift coefficient comparing the prior art SC2110 airfoil as compared to the SC36210 airfoil of the present invention.

FIGS. 5 and 6 illustrate the improvement in maximum lift capability afforded by the SC36210 airfoil. The increase in lift performance was advantageously not accompanied by a reduction in high speed transonic capability (FIG. 7). The SC36210 drag divergence Mach number is comparable to the SC 2110 at 0.785 but the SC2110 "drag creep" between Mach numbers of 0.7 to 0.775 is effectively eliminated in the SC36210. Applicant has determined that the SC36210 increases the knot cruse efficiency of a high speed helicopter rotor by approximately 14% without reducing the hover figure of merit.

The SC36210 is one of a family of SC362XX airfoil profiles (FIG. 8B) in which the airfoil thickness to chord ratios (t/c) are represented by the last two numerals of the airfoil number such that the SC36212 airfoil profile is a 12% airfoil and the SC36210 airfoil profile is a 10% airfoil. The SC36212 is formed by scaling all SC36210 y/c values by a factor of 1.2. Therefore, the SC36212 is 20% thicker than the SC36210. All x/c values are unchanged.

The SC36212 airfoil profile section is preferably utilized in the inboard region 42 (FIG. 2A) of the main rotor blade 20, such as, for example, inboard of approximately 0.5 R, then transitions to the SC36210 airfoil profile section. The SC36210 airfoil profile may be maintained from approximately 0.5 R to the outer tip end 48 of the rotor blade 20. Alternatively, the SC36210 airfoil profile section may be used in the tip region 46 of the rotor blade (approximately the outer 15 to 20%).

In addition to the SC362XX family of airfoils, which are preferably utilize in the main regions of the rotor blade 20, an inboard airfoil profile section with higher thickness ratios may be incorporated into the rotor blade 20. That is, inboard of the SC36212 airfoil profile may be the SC325218 airfoil profile. FIG. 2C illustrates the significant increase in thickness forward of the 30% x/c location when compared to prior art airfoils of similar thickness to chord ratios. The SC3252XX airfoil family is a result of modifications to the thickness and camber distribution of the SC362XX airfoil family to provide the lift and drag characteristics necessary to insure optimum rotor performance.

Since the SC3252XX airfoil family is located on the inboard portion of the rotor blade 20, the rotational velocities at which they operate are significantly lower than their outboard counterparts. Therefore, the Mach number at which maximum lift was optimized for this family is significantly lower when compared to the SC362XX family (0.25 vs. 0.6). The lift coefficient at which the drag divergence Mach number was optimized remained the same as the SC362XX family (0.2).

FIGS. 8A and 8B provide contour plots of the SC3252XX family of airfoils (16% and 18% T/C) and the SC362XX family of airfoils (7%, 10% and 12% T/C) respectively. The thickness of the airfoil y/c is plotted against the nondimensional distance from the leading edge of the airfoil along the chord line of the airfoil x/c. The values define the thickness distribution curves and are proportional to each other or scaled from each other at a given x/c. An infinite number of thickness distribution curves may be formed in a similar manner.

Figure 9:
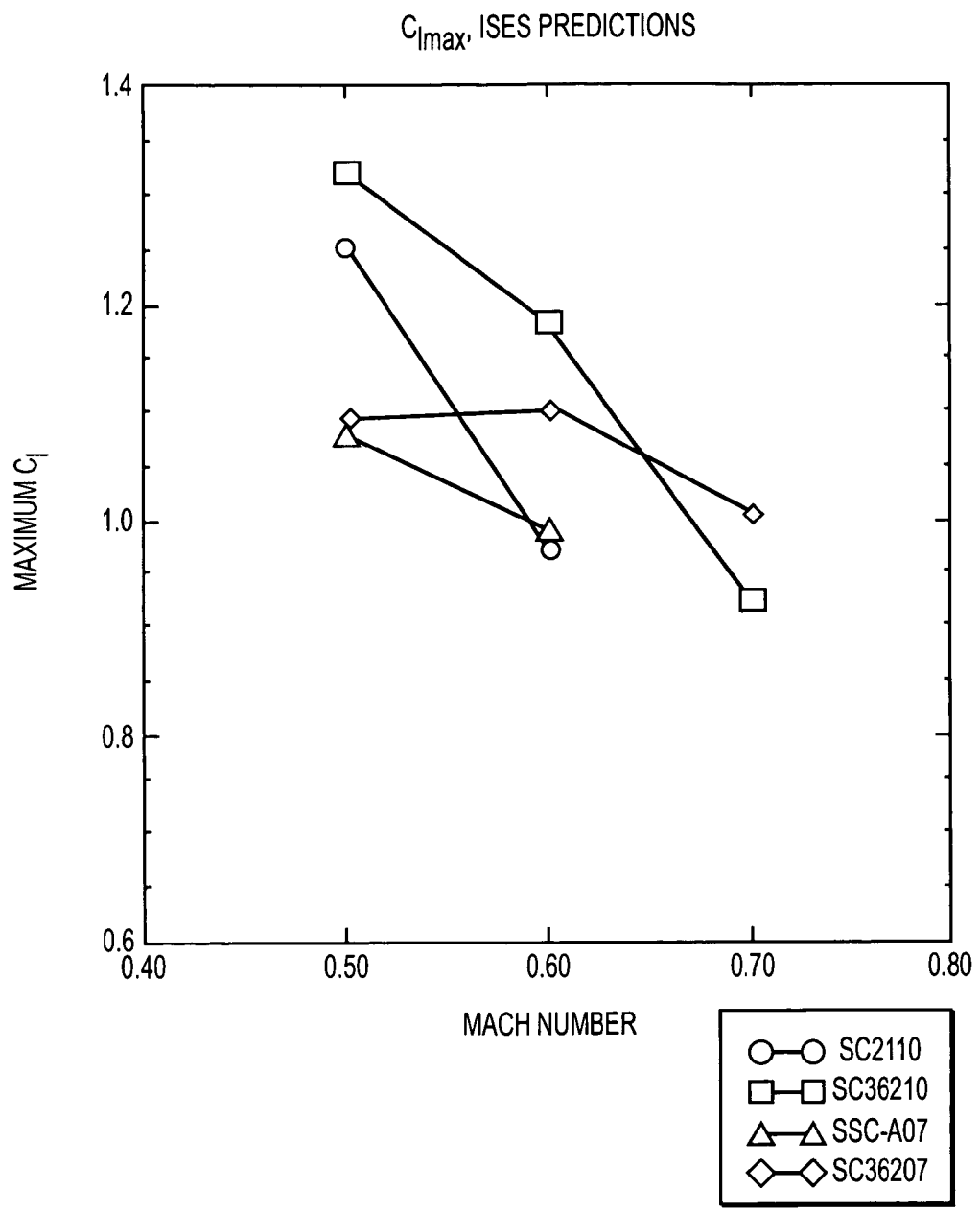
FIG. 9 is a graphical representation of CL Max vs. Mach number prediction for the SC36210 airfoil of the present invention as compared to other airfoils.
Figure 10:
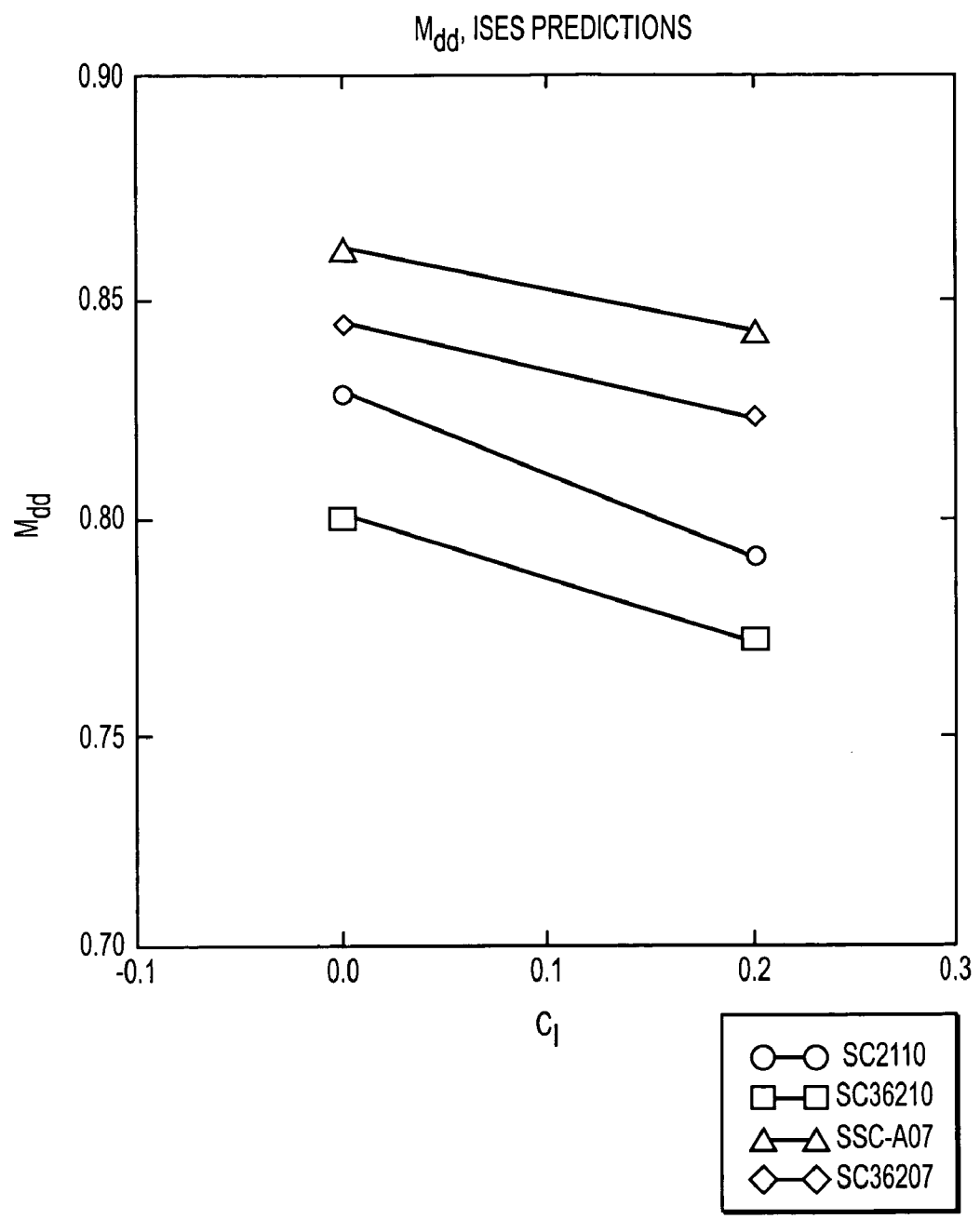
FIG. 10 is a graphical representation of the drag divergence Mach number ($M_{dd}$) vs. coefficient of lift prediction for the SC36210 airfoil as compared to other airfoils. Drag divergence Mach number is the Mach number at which the slope of a $C_d$ vs. Mach number curve (at constant lift coefficient) is equal to 0.1.

The results of this effort are presented in FIGS. 9 and 10 which compares $C_{l_{max}}$ and $M_{dd}$ ISES predictions respectively for the SC36210, its 7% cousin the SC36207, and their prior art counterparts, the SC2110 and SSC-A07. These figures illustrate the improvement in maximum lift coefficient afforded by the new designs with little change in drag divergence characteristics.

TABLE I

| SC36210 | | | |
|---|---|---|---|
| Upper surface | | Lower surface | |
| X/C | Y/C | X/C | Y/C |
| 1.00000 | 0.00180 | 0.00000 | 0.00000 |
| 0.99543 | 0.00207 | 0.00026 | −0.00199 |
| 0.98967 | 0.00245 | 0.00135 | −0.00421 |
| 0.98252 | 0.00299 | 0.00305 | −0.00602 |
| 0.97394 | 0.00373 | 0.00522 | −0.00757 |
| 0.96424 | 0.00467 | 0.00784 | −0.00898 |
| 0.95384 | 0.00576 | 0.01103 | −0.01035 |
| 0.94308 | 0.00699 | 0.01493 | −0.01172 |
| 0.93216 | 0.00832 | 0.01978 | −0.01310 |
| 0.92116 | 0.00973 | 0.02583 | −0.01453 |
| 0.91011 | 0.01122 | 0.03325 | −0.01598 |
| 0.89905 | 0.01277 | 0.04200 | −0.01740 |
| 0.88798 | 0.01437 | 0.05177 | −0.01874 |
| 0.87690 | 0.01601 | 0.06218 | −0.01995 |
| 0.86581 | 0.01768 | 0.07293 | −0.02104 |
| 0.85471 | 0.01938 | 0.08385 | −0.02200 |
| 0.84361 | 0.02110 | 0.09487 | −0.02287 |
| 0.83250 | 0.02284 | 0.10595 | −0.02365 |
| 0.82138 | 0.02459 | 0.11706 | −0.02436 |
| 0.81026 | 0.02634 | 0.12819 | −0.02502 |
| 0.79914 | 0.02810 | 0.13934 | −0.02564 |
| 0.78804 | 0.02984 | 0.15050 | −0.02622 |
| 0.77693 | 0.03157 | 0.16167 | −0.02677 |
| 0.76584 | 0.03327 | 0.17284 | −0.02731 |
| 0.75475 | 0.03494 | 0.18402 | −0.02782 |
| 0.74367 | 0.03657 | 0.19520 | −0.02832 |
| 0.73259 | 0.03816 | 0.20638 | −0.02880 |
| 0.72151 | 0.03970 | 0.21756 | −0.02926 |
| 0.71043 | 0.04120 | 0.22873 | −0.02971 |
| 0.69935 | 0.04265 | 0.23991 | −0.03013 |
| 0.68826 | 0.04405 | 0.25108 | −0.03052 |
| 0.67717 | 0.04540 | 0.26224 | −0.03090 |
| 0.66607 | 0.04671 | 0.27341 | −0.03124 |
| 0.65498 | 0.04798 | 0.28457 | −0.03156 |
| 0.64387 | 0.04920 | 0.29574 | −0.03185 |
| 0.63276 | 0.05038 | 0.30690 | −0.03211 |
| 0.62165 | 0.05151 | 0.31806 | −0.03234 |
| 0.61054 | 0.05261 | 0.32922 | −0.03254 |
| 0.59942 | 0.05367 | 0.34038 | −0.03271 |
| 0.58830 | 0.05469 | 0.35154 | −0.03285 |
| 0.57717 | 0.05567 | 0.36270 | −0.03295 |
| 0.56604 | 0.05661 | 0.37386 | −0.03303 |
| 0.55492 | 0.05752 | 0.38502 | −0.03307 |
| 0.54379 | 0.05838 | 0.39618 | −0.03309 |
| 0.53266 | 0.05921 | 0.40733 | −0.03307 |
| 0.52152 | 0.06001 | 0.41849 | −0.03302 |
| 0.51039 | 0.06076 | 0.42965 | −0.03294 |
| 0.49925 | 0.06147 | 0.44081 | −0.03283 |
| 0.48812 | 0.06215 | 0.45197 | −0.03269 |
| 0.47698 | 0.06279 | 0.46313 | −0.03251 |
| 0.46584 | 0.06339 | 0.47428 | −0.03231 |
| 0.45470 | 0.06395 | 0.48544 | −0.03207 |
| 0.44356 | 0.06448 | 0.49659 | −0.03180 |
| 0.43243 | 0.06496 | 0.50775 | −0.03149 |
| 0.42129 | 0.06540 | 0.51890 | −0.03116 |
| 0.41015 | 0.06581 | 0.53006 | −0.03079 |
| 0.39902 | 0.06616 | 0.54121 | −0.03039 |
| 0.38788 | 0.06648 | 0.55237 | −0.02996 |
| 0.37675 | 0.06674 | 0.56352 | −0.02950 |
| 0.36563 | 0.06696 | 0.57468 | −0.02901 |
| 0.35450 | 0.06712 | 0.58584 | −0.02849 |
| 0.34700 | 0.06723 | 0.59700 | −0.02794 |
| 0.33226 | 0.06729 | 0.60816 | −0.02737 |
| 0.32115 | 0.06728 | 0.61932 | −0.02677 |
| 0.31004 | 0.06721 | 0.63048 | −0.02615 |
| 0.29893 | 0.06708 | 0.64164 | −0.02551 |
| 0.28783 | 0.06688 | 0.65280 | −0.02484 |
| 0.27673 | 0.06662 | 0.66397 | −0.02414 |
| 0.26564 | 0.06628 | 0.67513 | −0.02343 |
| 0.25456 | 0.06586 | 0.68629 | −0.02269 |
| 0.24348 | 0.06537 | 0.69746 | −0.02194 |
| 0.23241 | 0.06479 | 0.70863 | −0.02116 |
| 0.22135 | 0.06412 | 0.71979 | −0.02037 |

TABLE I-continued

SC36210

| Upper surface | | Lower surface | |
|---|---|---|---|
| X/C | Y/C | X/C | Y/C |
| 0.21030 | 0.06337 | 0.73096 | −0.01956 |
| 0.19927 | 0.06252 | 0.74214 | −0.01874 |
| 0.18824 | 0.06157 | 0.75331 | −0.01790 |
| 0.17724 | 0.06051 | 0.76449 | −0.01706 |
| 0.16625 | 0.05934 | 0.77566 | −0.01620 |
| 0.15529 | 0.05804 | 0.78684 | −0.01534 |
| 0.14436 | 0.05660 | 0.79802 | −0.01448 |
| 0.13346 | 0.05502 | 0.80920 | −0.01361 |
| 0.12260 | 0.05327 | 0.82039 | −0.01274 |
| 0.11178 | 0.05134 | 0.83157 | −0.01187 |
| 0.10102 | 0.04921 | 0.84274 | −0.01101 |
| 0.09032 | 0.04688 | 0.85392 | −0.01015 |
| 0.07971 | 0.04433 | 0.86509 | −0.00930 |
| 0.06925 | 0.04153 | 0.87626 | −0.00847 |
| 0.05900 | 0.03849 | 0.88742 | −0.00765 |
| 0.04914 | 0.03520 | 0.89856 | −0.00686 |
| 0.03988 | 0.03171 | 0.90970 | −0.00610 |
| 0.03154 | 0.02813 | 0.92081 | −0.00538 |
| 0.02438 | 0.02460 | 0.93187 | −0.00471 |
| 0.01851 | 0.02125 | 0.94286 | −0.00411 |
| 0.01380 | 0.01815 | 0.95368 | −0.00359 |
| 0.01006 | 0.01530 | 0.96413 | −0.00316 |
| 0.00709 | 0.01264 | 0.97387 | −0.00284 |
| 0.00472 | 0.01011 | 0.98248 | −0.00263 |
| 0.00287 | 0.00766 | 0.98965 | −0.00252 |
| 0.00145 | 0.00526 | 0.99542 | −0.00248 |
| 0.00047 | 0.00285 | 1.00000 | −0.00248 |

TABLE II

SC36212

| Upper surface | | Lower surface | |
|---|---|---|---|
| X/C | Y/C | X/C | Y/C |
| 1.00000 | 0.00226 | 0.00000 | 0.00000 |
| 0.99543 | 0.00256 | 0.00026 | −0.00236 |
| 0.98967 | 0.00298 | 0.00135 | −0.00510 |
| 0.98252 | 0.00359 | 0.00305 | −0.00738 |
| 0.97394 | 0.00443 | 0.00522 | −0.00936 |
| 0.96424 | 0.00548 | 0.00784 | −0.01118 |
| 0.95384 | 0.00673 | 0.01103 | −0.01296 |
| 0.94308 | 0.00813 | 0.01493 | −0.01475 |
| 0.93216 | 0.00965 | 0.01978 | −0.01658 |
| 0.92116 | 0.01128 | 0.02583 | −0.01848 |
| 0.91011 | 0.01299 | 0.03325 | −0.02043 |
| 0.89905 | 0.01476 | 0.04200 | −0.02236 |
| 0.88798 | 0.01660 | 0.05177 | −0.02419 |
| 0.87690 | 0.01848 | 0.06218 | −0.02586 |
| 0.86581 | 0.02040 | 0.07293 | −0.02736 |
| 0.85471 | 0.02236 | 0.08385 | −0.02870 |
| 0.84361 | 0.02434 | 0.09487 | −0.02991 |
| 0.83250 | 0.02634 | 0.10595 | −0.03100 |
| 0.82138 | 0.02835 | 0.11706 | −0.03199 |
| 0.81026 | 0.03037 | 0.12819 | −0.03291 |
| 0.79914 | 0.03238 | 0.13934 | −0.03376 |
| 0.78804 | 0.03438 | 0.15050 | −0.03455 |
| 0.77693 | 0.03637 | 0.16167 | −0.03529 |
| 0.76584 | 0.03833 | 0.17284 | −0.03601 |
| 0.75475 | 0.04025 | 0.18402 | −0.03668 |
| 0.74367 | 0.04212 | 0.19520 | −0.03733 |
| 0.73259 | 0.04395 | 0.20638 | −0.03795 |
| 0.72151 | 0.04573 | 0.21756 | −0.03854 |
| 0.71043 | 0.04746 | 0.22873 | −0.03910 |
| 0.69935 | 0.04913 | 0.23991 | −0.03962 |
| 0.68826 | 0.05075 | 0.25108 | −0.04011 |
| 0.67717 | 0.05231 | 0.26224 | −0.04057 |
| 0.66607 | 0.05382 | 0.27341 | −0.04098 |
| 0.65498 | 0.05528 | 0.28457 | −0.04136 |

TABLE II-continued

SC36212

| Upper surface | | Lower surface | |
|---|---|---|---|
| X/C | Y/C | X/C | Y/C |
| 0.64387 | 0.05669 | 0.29574 | −0.04170 |
| 0.63276 | 0.05805 | 0.30690 | −0.04200 |
| 0.62165 | 0.05937 | 0.31806 | −0.04227 |
| 0.61054 | 0.06063 | 0.32922 | −0.04249 |
| 0.59942 | 0.06185 | 0.34038 | −0.04267 |
| 0.58830 | 0.06303 | 0.35154 | −0.04281 |
| 0.57717 | 0.06416 | 0.36270 | −0.04291 |
| 0.56604 | 0.06525 | 0.37386 | −0.04298 |
| 0.55492 | 0.06629 | 0.38502 | −0.04300 |
| 0.54379 | 0.06729 | 0.39618 | −0.04299 |
| 0.53266 | 0.06824 | 0.40733 | −0.04293 |
| 0.52152 | 0.06915 | 0.41849 | −0.04284 |
| 0.51039 | 0.07001 | 0.42965 | −0.04270 |
| 0.49925 | 0.07083 | 0.44081 | −0.04254 |
| 0.48812 | 0.07160 | 0.45197 | −0.04233 |
| 0.47698 | 0.07233 | 0.46313 | −0.04208 |
| 0.46584 | 0.07301 | 0.47428 | −0.04179 |
| 0.45470 | 0.07365 | 0.48544 | −0.04147 |
| 0.44356 | 0.07424 | 0.49659 | −0.04111 |
| 0.43243 | 0.07478 | 0.50775 | −0.04070 |
| 0.42129 | 0.07528 | 0.51890 | −0.04026 |
| 0.41015 | 0.07573 | 0.53006 | −0.03977 |
| 0.39902 | 0.07613 | 0.54121 | −0.03925 |
| 0.38788 | 0.07647 | 0.55237 | −0.03869 |
| 0.37675 | 0.07676 | 0.56352 | −0.03809 |
| 0.36563 | 0.07699 | 0.57468 | −0.03746 |
| 0.35450 | 0.07716 | 0.58584 | −0.03679 |
| 0.34338 | 0.07727 | 0.59700 | −0.03609 |
| 0.33226 | 0.07731 | 0.60816 | −0.03536 |
| 0.32115 | 0.07729 | 0.61932 | −0.03459 |
| 0.31004 | 0.07719 | 0.63048 | −0.03379 |
| 0.29893 | 0.07702 | 0.64164 | −0.03296 |
| 0.28783 | 0.07677 | 0.65280 | −0.03210 |
| 0.27673 | 0.07645 | 0.66397 | −0.03122 |
| 0.26564 | 0.07604 | 0.67513 | −0.03030 |
| 0.25456 | 0.07555 | 0.68629 | −0.02935 |
| 0.24348 | 0.07496 | 0.69746 | −0.02838 |
| 0.23241 | 0.07429 | 0.70863 | −0.02739 |
| 0.22135 | 0.07351 | 0.71979 | −0.02637 |
| 0.21030 | 0.07264 | 0.73096 | −0.02532 |
| 0.19927 | 0.07166 | 0.74214 | −0.02426 |
| 0.18824 | 0.07056 | 0.75331 | −0.02317 |
| 0.17724 | 0.06935 | 0.76449 | −0.02208 |
| 0.16625 | 0.06801 | 0.77566 | −0.02096 |
| 0.15529 | 0.06653 | 0.78684 | −0.01985 |
| 0.14436 | 0.06489 | 0.79802 | −0.01872 |
| 0.13346 | 0.06309 | 0.80920 | −0.01758 |
| 0.12260 | 0.06110 | 0.82039 | −0.01645 |
| 0.11178 | 0.05891 | 0.83157 | −0.01532 |
| 0.10102 | 0.05650 | 0.84274 | −0.01419 |
| 0.09032 | 0.05386 | 0.85392 | −0.01308 |
| 0.07971 | 0.05096 | 0.86509 | −0.01197 |
| 0.06925 | 0.04779 | 0.87626 | −0.01089 |
| 0.05900 | 0.04433 | 0.88742 | −0.00982 |
| 0.04914 | 0.04060 | 0.89856 | −0.00879 |
| 0.03988 | 0.03663 | 0.90970 | −0.00780 |
| 0.03154 | 0.03254 | 0.92081 | −0.00686 |
| 0.02438 | 0.02851 | 0.93187 | −0.00598 |
| 0.01851 | 0.02469 | 0.94286 | −0.00518 |
| 0.01380 | 0.02114 | 0.95368 | −0.00449 |
| 0.01006 | 0.01786 | 0.96413 | −0.00390 |
| 0.00709 | 0.01480 | 0.97387 | −0.00346 |
| 0.00472 | 0.01188 | 0.98248 | −0.00315 |
| 0.00287 | 0.00905 | 0.98965 | −0.00298 |
| 0.00145 | 0.00625 | 0.99542 | −0.00290 |
| 0.00047 | 0.00343 | 1.00000 | −0.00287 |

TABLE III

SC325218

| Upper Surface | | Lower Surface | |
|---|---|---|---|
| X/C | Y/C | X/C | Y/C |
| 1.000000 | 0.002184 | 0.000000 | 0.000000 |
| 0.992070 | 0.003803 | 0.000007 | −0.000717 |
| 0.980725 | 0.006075 | 0.000202 | −0.003820 |
| 0.965813 | 0.009022 | 0.000669 | −0.006919 |
| 0.948872 | 0.012333 | 0.001416 | −0.010027 |
| 0.931296 | 0.015720 | 0.002456 | −0.013091 |
| 0.913609 | 0.019073 | 0.003818 | −0.016076 |
| 0.895878 | 0.022370 | 0.005540 | −0.018986 |
| 0.878074 | 0.025621 | 0.007671 | −0.021839 |
| 0.860171 | 0.028842 | 0.010277 | −0.024690 |
| 0.842172 | 0.032054 | 0.013418 | −0.027600 |
| 0.824187 | 0.035255 | 0.017177 | −0.030607 |
| 0.806207 | 0.038467 | 0.021671 | −0.033739 |
| 0.788226 | 0.041697 | 0.027055 | −0.037012 |
| 0.770243 | 0.044951 | 0.033487 | −0.040431 |
| 0.752225 | 0.048225 | 0.041112 | −0.043977 |
| 0.734247 | 0.051496 | 0.050013 | −0.047599 |
| 0.716311 | 0.054744 | 0.060146 | −0.051208 |
| 0.698466 | 0.057945 | 0.071420 | −0.054711 |
| 0.680742 | 0.061077 | 0.083675 | −0.058038 |
| 0.663131 | 0.064121 | 0.096752 | −0.061137 |
| 0.645572 | 0.067082 | 0.110532 | −0.063979 |
| 0.628077 | 0.069950 | 0.124904 | −0.066567 |
| 0.610626 | 0.072719 | 0.139743 | −0.068884 |
| 0.593184 | 0.075394 | 0.154961 | −0.070942 |
| 0.575774 | 0.077966 | 0.170446 | −0.072733 |
| 0.558373 | 0.080434 | 0.186151 | −0.074262 |
| 0.540992 | 0.082797 | 0.202019 | −0.075537 |
| 0.523615 | 0.085054 | 0.218029 | −0.076562 |
| 0.506261 | 0.087201 | 0.234149 | −0.077345 |
| 0.488927 | 0.089235 | 0.250333 | −0.077893 |
| 0.471626 | 0.091150 | 0.266550 | −0.078201 |
| 0.454372 | 0.092942 | 0.282820 | −0.078275 |
| 0.437182 | 0.094598 | 0.299135 | −0.078121 |
| 0.420061 | 0.096114 | 0.315536 | −0.077736 |
| 0.403036 | 0.097479 | 0.332050 | −0.077137 |
| 0.386131 | 0.098676 | 0.348691 | −0.076331 |
| 0.369354 | 0.099692 | 0.365467 | −0.075332 |
| 0.352671 | 0.100518 | 0.382359 | −0.074156 |
| 0.336106 | 0.101144 | 0.399353 | −0.072813 |
| 0.319614 | 0.101556 | 0.416435 | −0.071316 |
| 0.303158 | 0.101756 | 0.433588 | −0.069672 |
| 0.286722 | 0.101741 | 0.450806 | −0.067892 |
| 0.270266 | 0.101510 | 0.468090 | −0.065979 |
| 0.253767 | 0.101064 | 0.485442 | −0.063946 |
| 0.237213 | 0.100415 | 0.502864 | −0.061798 |
| 0.220631 | 0.099565 | 0.520345 | −0.059546 |
| 0.204065 | 0.098526 | 0.537880 | −0.057197 |
| 0.187617 | 0.097305 | 0.555466 | −0.054757 |
| 0.171516 | 0.095906 | 0.573102 | −0.052236 |
| 0.155965 | 0.094311 | 0.590820 | −0.049636 |
| 0.141137 | 0.092501 | 0.608582 | −0.046973 |
| 0.127167 | 0.090438 | 0.626420 | −0.044243 |
| 0.114078 | 0.088091 | 0.644353 | −0.041462 |
| 0.101850 | 0.085439 | 0.662351 | −0.038645 |
| 0.090465 | 0.082471 | 0.680407 | −0.035800 |
| 0.079865 | 0.079174 | 0.698493 | −0.032950 |
| 0.070018 | 0.075560 | 0.716537 | −0.030119 |
| 0.060908 | 0.071651 | 0.734466 | −0.027333 |
| 0.052517 | 0.067471 | 0.752265 | −0.024612 |
| 0.044829 | 0.063053 | 0.769939 | −0.021969 |
| 0.037843 | 0.058448 | 0.787492 | −0.019422 |
| 0.031549 | 0.053700 | 0.804940 | −0.016982 |
| 0.025928 | 0.048859 | 0.822259 | −0.014662 |
| 0.020965 | 0.043987 | 0.839459 | −0.012483 |
| 0.016639 | 0.039141 | 0.856553 | −0.010448 |
| 0.012920 | 0.034378 | 0.873516 | −0.008583 |
| 0.009774 | 0.029749 | 0.890343 | −0.006898 |
| 0.007160 | 0.025284 | 0.907008 | −0.005409 |
| 0.005028 | 0.020999 | 0.923459 | −0.004141 |
| 0.003334 | 0.016907 | 0.939587 | −0.003115 |
| 0.002035 | 0.013002 | 0.955129 | −0.002364 |
| 0.001077 | 0.009283 | 0.969565 | −0.001922 |
| 0.000430 | 0.005773 | 0.982102 | −0.001796 |
| 0.000080 | 0.002457 | 0.992233 | −0.001947 |
| 0.000000 | 0.000000 | 1.000000 | −0.002222 |

It is to be understood that the Mach number at which drag divergence occurs over the range of lift coefficients will vary notably with the camber and percent thickness airfoil, but is also affected by the particular helicopter with which the rotor blade is utilized. This statement is also applicable to the advantage gained in the form of increased performance and power which will vary depending on the type of helicopter with which the airfoil sections are utilized.

It should be understood by one of ordinary skill in the art, the various blade characteristics disclosed herein may be utilized singularly or in any combination depending on the particular design requirements of the aircraft. Moreover, although the invention has been generally described in connection with a high speed compound rotary-wing aircraft having a dual, contra-rotating, coaxial rotor system, the invention is also equally applicable to more conventional aircraft configurations such as conventional single rotor helicopter or a tandem rotor helicopter, especially on the outer tip portion of the main rotor blade, such as, for example, the outer 15% to 20% of the main rotor blade on a conventional single rotor helicopter, where the rotor blade is subjected to higher speeds. In a particular preferred embodiment SC36210 of SC362XX airfoil family is used in combination with the tip planform as discussed in U.S. Pat. No. 7,513,750, entitled "ROTOR BLADE TIP PLANFORM," which is assigned to the assignee of the instant invention and which is hereby incorporated herein in its entirety.

It should be understood that relative positional terms such as "forward," "aft,""upper," "lower," "above," "below," "inboard," "outboard," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A main rotor blade section comprising:
an inboard region; and
a main region outboard of said inboard region, said main region including an airfoil profile section which defines an airfoil thickness along a chord line within said airfoil profile section, said airfoil profile section having leading edge and a trailing edge, an upper airfoil surface and a lower airfoil surface which extend between said leading edge and said trailing edges as defined by a set of coordinates in which an airfoil thickness is plotted against a non-dimensional distance from said leading edge of said airfoil profile section along said chord line, as a set of Y/C coordinates scaled by a desired factor at a given X/C as listed in Table I, wherein
  X is the linear displacement along the chord line extending between the leading edge and the trailing edge,
  C is the chordal length of the airfoil cross section measured between the airfoil leading edge and the airfoil trailing edge; and
  Y is a transverse displacement of the airfoil surface from the chord line.

2. The section as recited in claim 1, wherein said main region includes a tip region defined by said main region, said airfoil profile section located at least partially within said tip region.

3. The section as recited in claim 2, wherein said tip region is defined by an outboard 20% of the main rotor blade.

4. The section as recited in claim 1, wherein an airfoil profile section defined by said set of Y/C coordinates listed in Table II is located inboard of said airfoil profile section defined by said set of Y/C coordinates listed in Table I said Y/C coordinates listed in Table II by a desired factor at a given X/C.

5. The section as recited in claim 4, wherein an airfoil profile section defined by said set of Y/C coordinates listed in Table III is located inboard of said airfoil profile section defined by said set of Y/C coordinates listed in Table II said Y/C coordinates listed in Table III by a desired factor at a given X/C.

6. The section as recited in claim 1, wherein an airfoil profile section defined by said set of Y/C coordinates listed in Table III is located inboard of said airfoil profile section defined by said set of Y/C coordinates listed in Table I said Y/C coordinates listed in Table III by a desired factor at a given X/C.

7. The section as recited in claim 1, wherein said Y/C coordinates listed in Table I are scaled by a factor of 1.0 while said X/C values are unchanged.

8. The section as recited in claim 7, wherein said set of Y/C coordinates listed in Table I are scaled by a factor of 1.2 while said X/C values are unchanged.

9. The section as recited in claim 1, wherein said airfoil profile section extends into said main section of a main rotor blade.

10. The section as recited in claim 1, wherein the main rotor blade is mounted to a single rotor helicopter.

11. The section as recited in claim 1, wherein the main rotor blade is mounted to a high speed compound rotary-wing aircraft.

12. The section as recited in claim 11, wherein the main rotor blade is mounted to a dual, contra-rotating, coaxial rotor system of said a high speed compound rotary-wing aircraft.

13. The section as recited in claim 12, wherein the high speed compound rotary-wing aircraft includes a propulsive system.

14. The section as recited in claim 1, wherein an approximately outer 20% of a length of said main region includes a tip region, said airfoil profile section within said tip region.

* * * * *